US012567626B1

(12) United States Patent
Francis et al.

(10) Patent No.: US 12,567,626 B1
(45) Date of Patent: Mar. 3, 2026

(54) ZINC BROMINE CELL HAVING ENCLOSED ELECTRODES

(71) Applicant: Golden Gate Battery LLC, San Jose, CA (US)

(72) Inventors: Prima Francis, Ernakulam (IN); Dhanya S, Pathanamthitta (IN); Aswathy C A, Thrissur (IN); Nila C M, Thrissur (IN); Vysakh Chandran, Chenganacherry (IN); Prashob Peter K J, Ernakulam (IN); Jipson T J, Kochin (IN); Muhammed Salim E, Kozhikode (IN); Saroj Kumar Sahu, San Jose, CA (US)

(73) Assignee: Golden Gate Battery LLC, San Jose, CA (US)

( * ) Notice: Subject to any disclaimer, the term of this patent is extended or adjusted under 35 U.S.C. 154(b) by 0 days.

(21) Appl. No.: 19/290,915

(22) Filed: Aug. 5, 2025

(51) Int. Cl.
*H01M 50/105* (2021.01)
*H01M 4/38* (2006.01)
*H01M 50/121* (2021.01)

(52) U.S. Cl.
CPC ......... *H01M 50/105* (2021.01); *H01M 4/381* (2013.01); *H01M 4/388* (2013.01); *H01M 50/121* (2021.01)

(58) Field of Classification Search
CPC .. H01M 50/106; H01M 50/121; H01M 4/381; H01M 4/388
See application file for complete search history.

(56) References Cited

U.S. PATENT DOCUMENTS 11,742,528 B1 8/2023 Sahu
2024/0055704 A1* 2/2024 Zhang ................. H01M 50/172

* cited by examiner

*Primary Examiner* — James Lee
(74) *Attorney, Agent, or Firm* — Chen-Chi Lin

(57) ABSTRACT

A zinc bromide electrochemical cell comprises an anode assembly, a cathode assembly, and a container. The anode assembly comprises an anode pouch comprising a first insulating microporous membrane. An anode is enclosed in the anode pouch. The cathode assembly comprises a cathode pouch comprising a second insulating microporous membrane. A cathode is enclosed in the cathode pouch. A first plurality of protrusion elements are on the first insulating microporous membrane. A second plurality of protrusion elements are on the second insulating microporous membrane.

20 Claims, 8 Drawing Sheets

FIG. 1A                 FIG. 1B

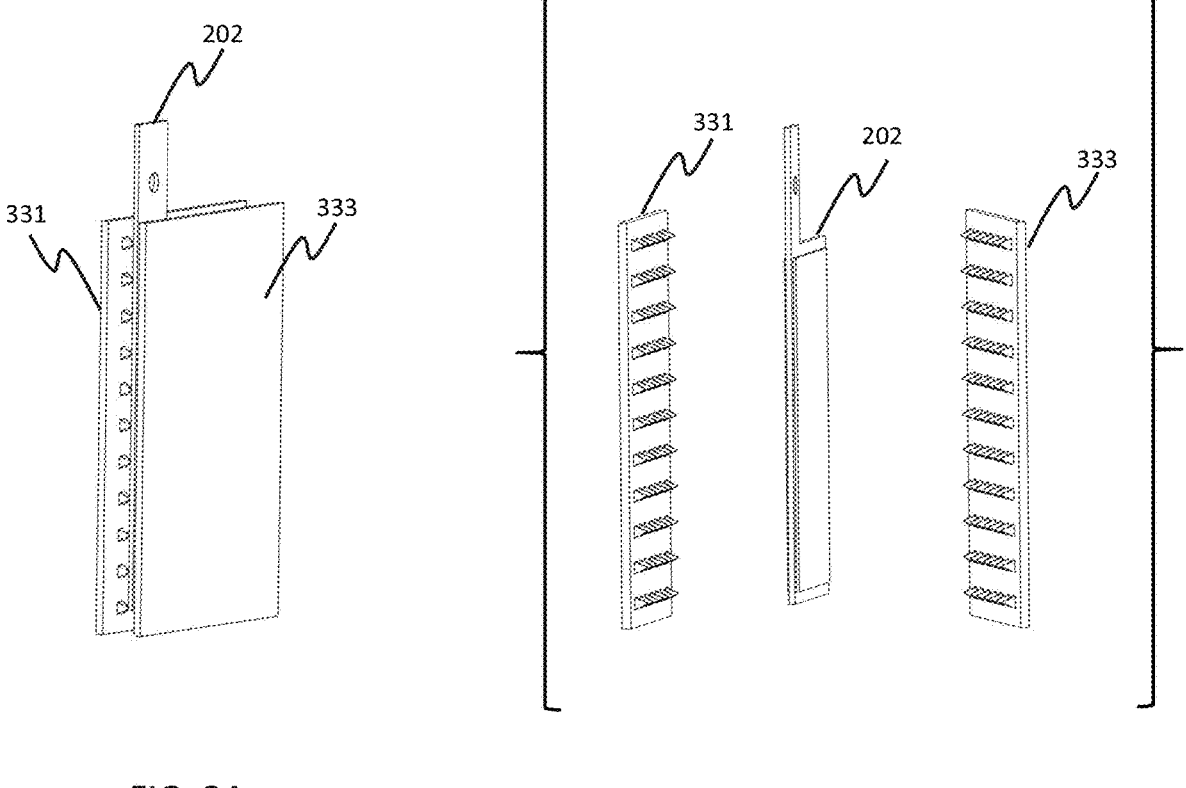
FIG. 3A                    FIG. 3B

820
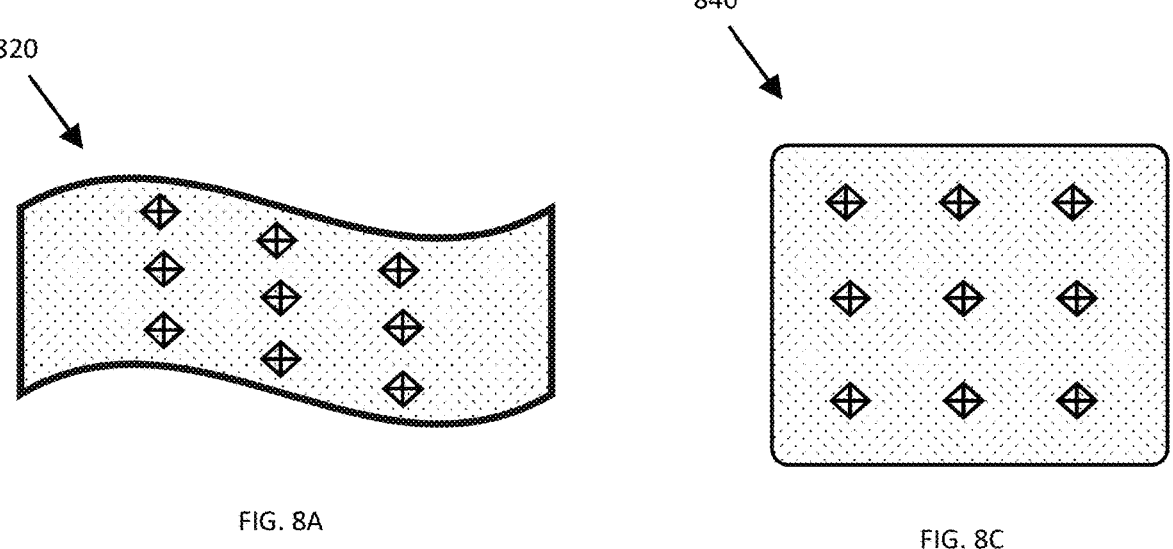
FIG. 8A
840
FIG. 8C
833                    824
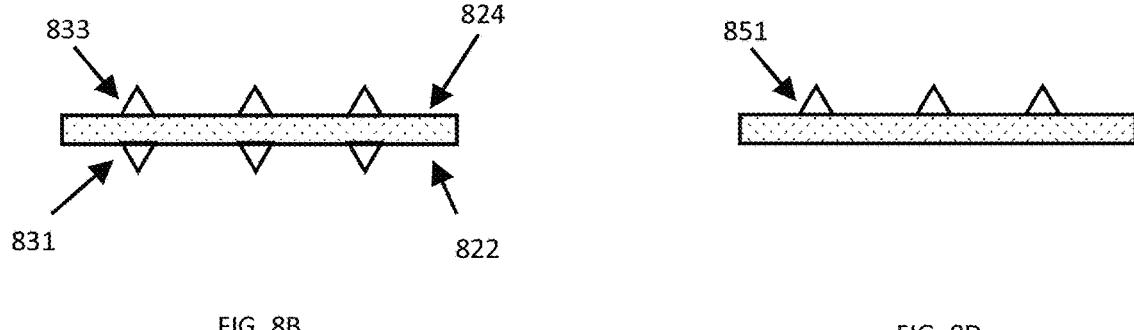
831                    822
FIG. 8B
851
FIG. 8D

ZINC BROMINE CELL HAVING ENCLOSED ELECTRODES

FIELD OF THE INVENTION

This invention relates generally to a zinc bromine electrochemical cell. More particularly, the present invention relates to a zinc bromine electrochemical cell having electrodes enclosed in pouches containing insulating microporous membranes, so as to enhance the cell durability against electrical shorts due to the growth of the dendrites.

BACKGROUND OF THE INVENTION

U.S. Pat. No. 11,742,528 to Sahu discloses a rollable, foldable, and stackable zinc bromine electrochemical cell. High energy density rechargeable batteries that do not use lithium or cobalt are of great interest in the field of electrochemical energy storage. There is a scarcity of both lithium and cobalt. Cobalt is known for being mined under unethical conditions. There are several non-lithium and non-cobalt battery technologies being developed, such as sodium-prussian blue, nickel-hydride, nickel-hydrogen, nickel-cadmium, iron-chromium, all vanadium, all iron, zinc air, and zinc bromine.

Zinc-bromine technology has been explored by many companies over last 40 years as a flow and a non-flow static battery. In a flow battery, the electrolytes are stored in tanks and pumped into the battery volume as required during charge and discharge operations. However, the ancillary systems such as the pumps, tanks, plumbing, and valves take up much volume and as a result the net system energy density of the battery becomes much less than what the basic battery can provide. A non-flow (static) battery consists of alternating anodes and cathodes, typically separated by a porous membrane, with necessary electrolyte contained in the cell itself. The non-flow battery facilitates compact and inexpensive construction.

All zinc bromine batteries suffer from growth of dendrites on the anode surface. When the dendrites grow large enough to reach the cathode, it causes an electrical short. A porous membrane separator is typically placed between the anode and the cathode to disrupt such propagation of dendrites. While this method is effective for many charge-discharge cycles of operation, eventually some dendrites make ways through the separator and reach the cathode so as to still short the cell.

SUMMARY OF THE INVENTION

In examples of the present disclosure, a zinc bromine, non-flow cell (battery) with enclosed electrodes is disclosed. Cell electrical shorting due to the propagation of anodic zinc dendrite is prevented and zinc plating is made uniform by enclosing anode and cathode separately with pouches containing ribbed (protrusion elements) insulating microporous membrane.

A zinc bromide electrochemical cell comprises an anode assembly, a cathode assembly, and a container. The anode assembly comprises an anode pouch comprising a first insulating microporous membrane. An anode is enclosed in the anode pouch. The cathode assembly comprises a cathode pouch comprising a second insulating microporous membrane. A cathode is enclosed in the cathode pouch. A first plurality of protrusion elements are on the first insulating microporous membrane. A second plurality of protrusion elements are on the second insulating microporous membrane.

BRIEF DESCRIPTION OF THE DRAWINGS

FIG. 3A is an isometric view and FIG. 3B is an exploded plot of a portion of an anode assembly in examples of the present disclosure.

FIG. 8A is a top view and FIG. 8B is a side view of a portion of an insulating microporous membrane; and FIG. 8C is a top view and FIG. 8D is a side view of a portion of another insulating microporous membrane in examples of the present disclosure.

DETAILED DESCRIPTION OF THE INVENTION

In a zinc bromide electrochemical cell, the electrolyte comprises an aqueous solution of zinc bromide in the concentration in a range from 0.5 to 12 molar. Aqueous zinc bromide dissociates into ionic species:

$$ZnBr_2 \leftrightarrow Zn^{2+} + 2Br^- \tag{1}$$

When charging the cell, the anodic reaction is:

$$Zn^{2+} + 2e \rightarrow Zn(solid, plated) \tag{2}$$

and the cathodic reaction is:

$$2Br^- \rightarrow Br_2 + 2e \tag{3}$$

When discharging the cell, the reactions in the opposite direction take place. Open circuit voltage (OCV) for this pair of reactions is about 1.75V, depending on the molarity $ZnBr_2$ salt and the temperature of the electrolyte. In examples of the present disclosure, "about" refers to +/−5%.

Zinc redox reaction of the present disclosure takes place at the anode:

$$Zn \leftrightarrow Zn^{2+} + 2e \tag{4}$$

Bromine redox reaction of the present disclosure takes place at the cathode:

$$Br_2 + 2e \leftrightarrow 2Br- \tag{5}$$

Since aqueous free bromine created in the charged state can be hazardous, a bromine sequestration compound (BSC) is added to the electrolyte, which reversibly binds most of the free bromine. A common BSC used in this disclosure is methyl ethyl pyrrolidinium bromide (MEP-Br), added to the electrolyte in the weight percent of 0.1% to 400% with respect to water. As elemental bromine is generated in the cathode, part of that is absorbed reversibly by MEPBr by virtue of the combination and de-combination reaction:

$$MEPBr + Br_2 \leftrightarrow [MEP]^+ [Br_3]^- \tag{6}$$

$[MEP]^+[Br_3]^-$ is a complex that is in liquid phase and is uniformly distributed in the electrolyte volume. Sequestering the elemental bromine in this type of complex helps towards the safety of the battery system, as in the case of a damage to the battery and electrolyte leaking out, the toxic and foul-smelling bromine would not get exposed. Besides, the more bromine is sequestered, the less of that is available in the main electrolyte volume, and therefore less being diffused to the anode side through the porous separator. That helps in reducing the self-discharge of the cell, thus greatly increasing its coulombic efficiency.

Figure 1:
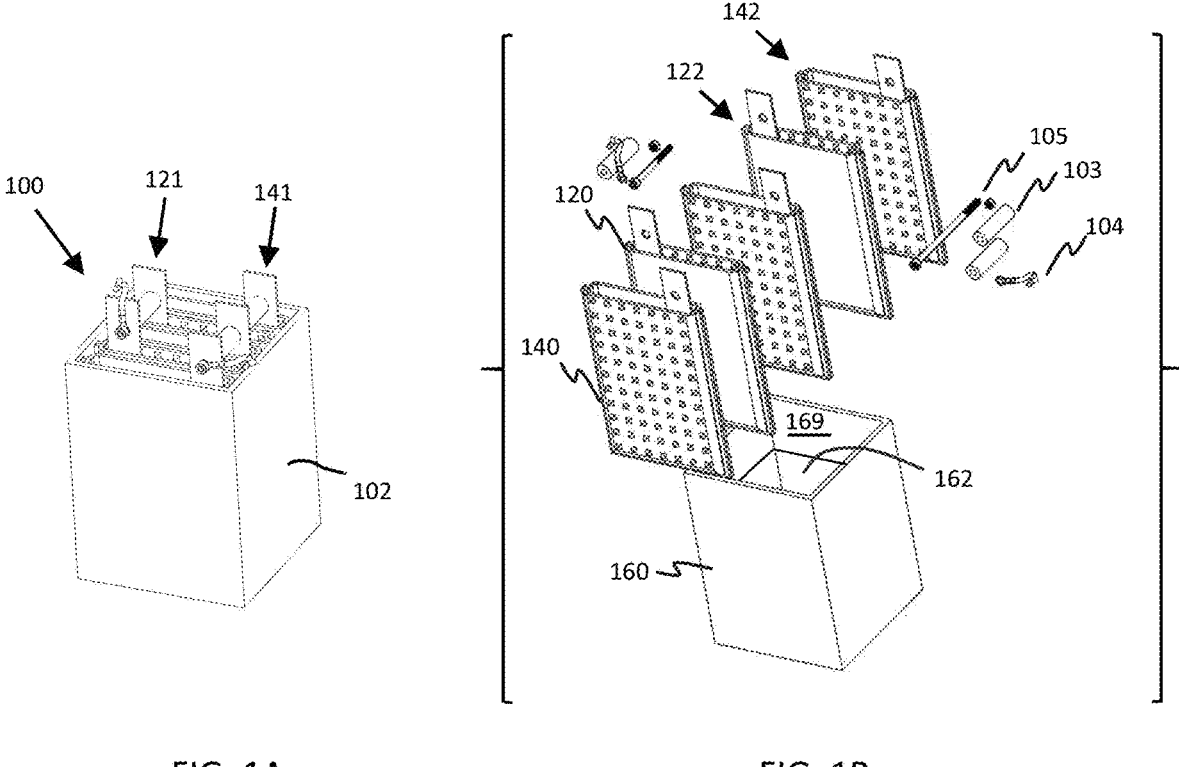
FIG. 1A is a top perspective view and FIG. 1B is an exploded plot of a battery containing a zinc bromide electrochemical cell in examples of the present disclosure.

FIG. 1A is a top perspective view and FIG. 1B is an exploded plot of a battery 100 containing a zinc bromide electrochemical cell 102 in examples of the present disclosure. The zinc bromide electrochemical cell 102 comprises an anode assembly 120, a cathode assembly 140, and a container 160.

In examples of the present disclosure, a compressible foam 169 is between the container 160 and the immediate anode assembly 120 or cathode assembly 140; and is between the container 160 and the cathode assembly 140, so as to facilitate electrical contact. In the following sequences, each anode assembly is represented by AA and each cathode assembly is represented by CA. In one example, a cell consists of CA-AA-CA-AA-CA, a respective compressible foam is between each outer CA and the container. In another example, a cell consists of AA-CA-AA-CA-AA, a respective compressible foam is between each outer AA and the container. In still another example, a cell consists of AA-CA-AA-CA, a first compressible foam is between the left AA and the container; and a second compressible foam is between the right CA and the container.

Figure 2:
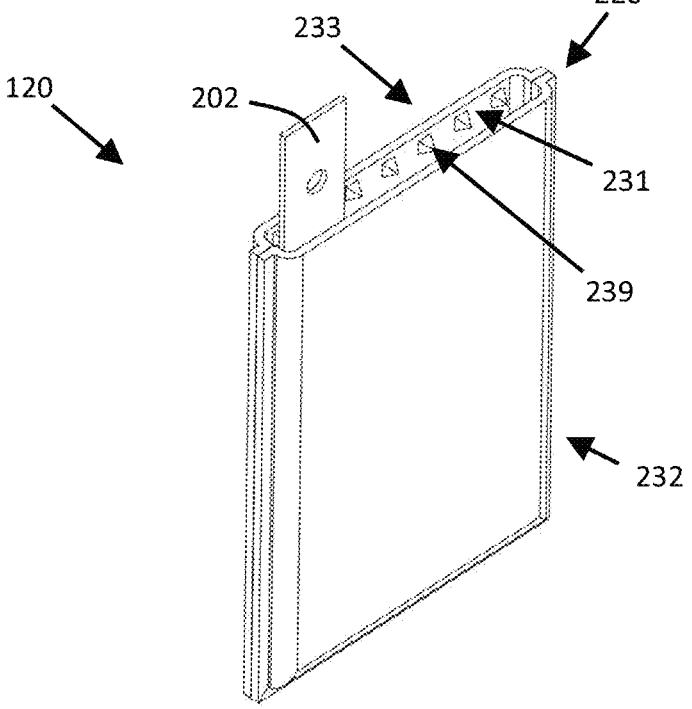
FIG. 2 is an isometric view of an anode assembly in examples of the present disclosure.

FIG. 2 is an isometric view of an anode assembly 120 in examples of the present disclosure. The anode assembly 120 comprises an anode pouch 220. The anode pouch 220 comprises a first insulating microporous membrane 232. In one example, the first insulating microporous membrane 232 comprises a first ribbed member 331 of FIG. 3A and a second ribbed member 333 of FIG. 3A. An anode 202 is enclosed in the anode pouch 220.

Figures 4A, 4B, 4C:
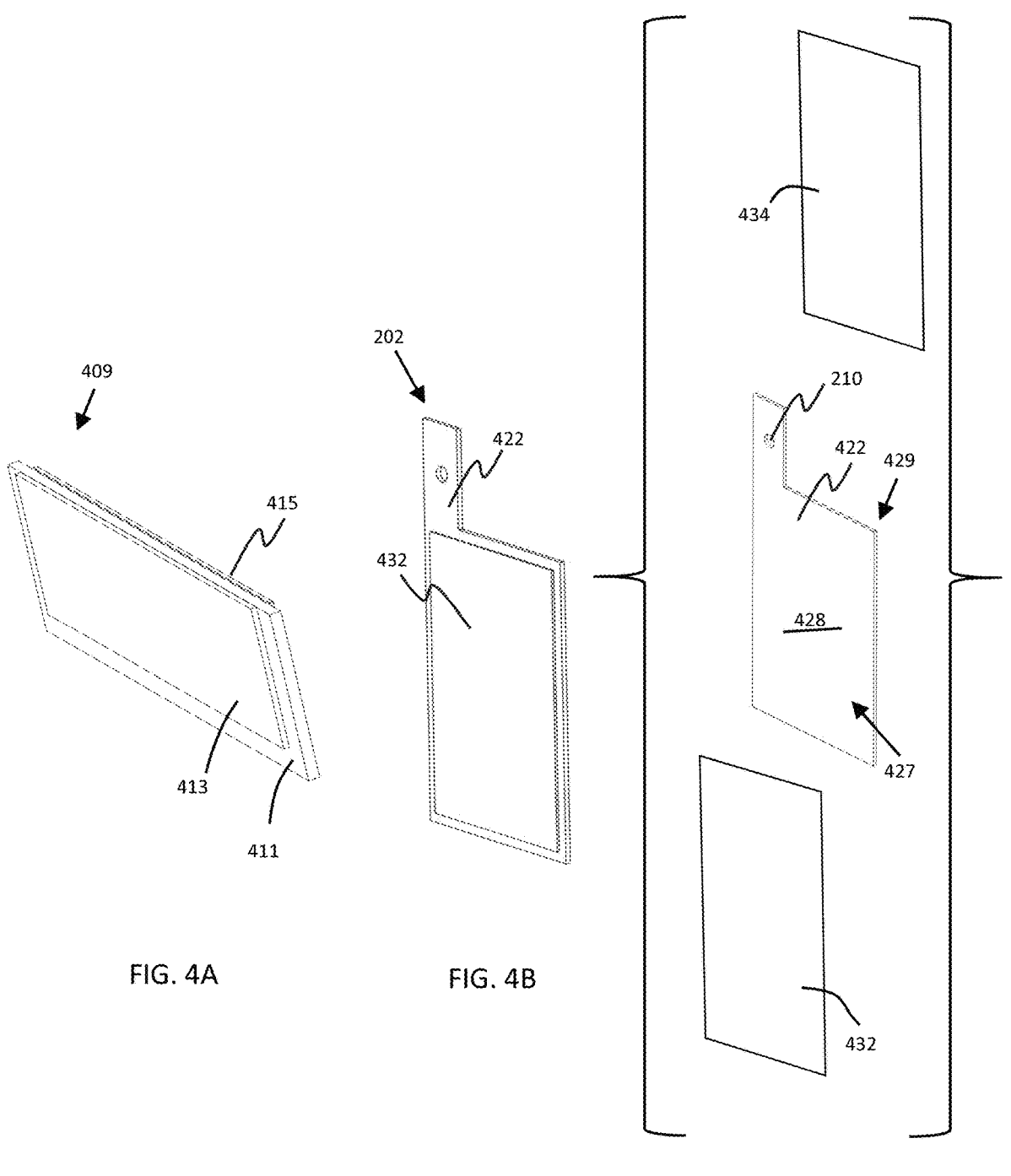
FIG. 4A is an isometric view of an anode.
FIG. 4B is an isometric view and FIG. 4C is an exploded plot of another anode in examples of the present disclosure.

FIG. 4A is an isometric view of an anode 409; and FIG. 4B is an isometric view and FIG. 4C is an exploded plot of another anode 202 in examples of the present disclosure. The anode 409 comprises a sheet 411, a first plate 413, and a second plate 415. The anode 202 comprises a sheet 422 of FIG. 4C, a first electrically conductive anode plate 432 of FIG. 4C, and a second electrically conductive anode plate 434 of FIG. 4C opposite the first electrically conductive anode plate 432. The first electrically conductive anode plate 432 and the second electrically conductive anode plate 434 are configured to be plated with zinc. Zinc redox reaction takes place at the anode [see equation (4) above]. In examples of the present disclosure, the sheet 422 of FIG. 4C is a titanium sheet or a graphite sheet. The sheet 422 of FIG. 4C is a zinc plated brass sheet. In examples of the present disclosure, the sheet 422 of FIG. 4C comprises a first side 427 of FIG. 4C, and a second side 429 of FIG. 4C opposite the first side 427. Each of the first side 427 and the second side 429 of the sheet 422 of FIG. 4C of the anode is coated with a respective conductive non-porous plastic-graphite composite 428. A thickness of the respective conductive non-porous plastic-graphite composite 428 is in a range from 0.2 mm to 1.0 mm. The respective conductive non-porous plastic-graphite composite has a bulk electrical resistivity less than 100 Ohm-cm.

Figure 5:
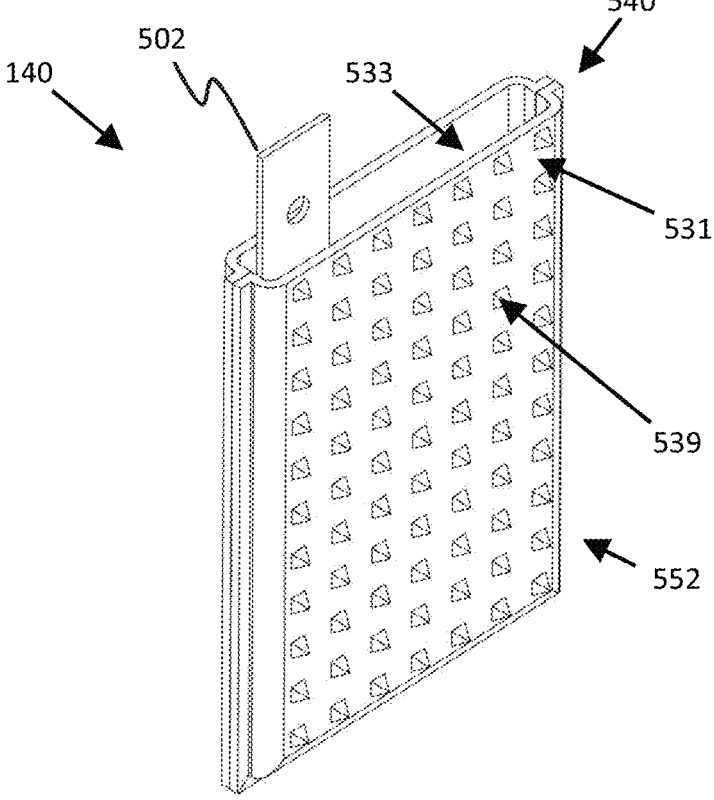
FIG. 5 is an isometric view of a cathode assembly in examples of the present disclosure.

FIG. 5 is an isometric view of a cathode assembly 140 in examples of the present disclosure. The cathode assembly 140 comprises a cathode pouch 540 comprising a second insulating microporous membrane 552. In one example, the second insulating microporous membrane 552 comprises a first ribbed member 651 of FIG. 6B and a second ribbed member 653 of FIG. 6B. A cathode 502 is enclosed in the cathode pouch 540. The cathode 502 of comprises a sheet 742 of FIG. 7C, a first electrically conductive cathode plate 752 of FIG. 7C, and a second electrically conductive cathode plate 754 of FIG. 7C opposite the first electrically conductive cathode plate 752 of FIG. 7C. The first electrically conductive cathode plate 752 of FIG. 7C and the second electrically conductive cathode plate 754 of FIG. 7C are configured to facilitate bromine redox reaction [see equation (5) above]. In examples of the present disclosure, the sheet 742 of FIG. 7C is a titanium sheet or a graphite sheet. The sheet 742 of FIG. 7C comprises a first side 727 of FIG. 7C, and a second side 729 of FIG. 7C opposite the first side 727. Each of the first side 727 and the second side 729 of the sheet 742 of FIG. 7C of the cathode is with a respective graphite or carbon felt 728.

FIG. 7A is an isometric view of a cathode 709; and FIG. 7B is an isometric view and FIG. 7C is an exploded plot of another cathode 502 in examples of the present disclosure. The cathode 709 comprises a sheet 711, a first plate 713, and a second plate 715. In examples of the present disclosure, the sheet 742 of FIG. 7C is a metallic sheet. The sheet 742 of FIG. 7C comprises a first side 727 of FIG. 7C, and a second side 729 of FIG. 7C opposite the first side 727. Each of the first side 727 and the second side 729 of the sheet 742 of FIG. 7C of the cathode is coated with a respective conductive non-porous thermoplastic-graphite composite. The respective conductive non-porous thermoplastic-graphite composite covered by a respective additional high-surface area structure 725. The respective additional high-surface area structure 725 is a graphite or carbon felt adhered to the respective conductive non-porous thermoplastic-graphite composite coating by applying heat treatment. In one example, the word "high" of "high-surface area" refers to a total surface area of a structure is larger than 3 times of a projected area of the structure on a plane. Rates of redox reactions are proportional to the surface area, therefore a high surface area results in more efficient reactions and therefore the energy wasted in charge and discharge will be much less.

Each of the first electrically conductive cathode plate 752 of FIG. 7C and the second electrically conductive cathode plate 754 of FIG. 7C is made suitable to have adequate surface area and have chemical tolerance to aqueous bromine for the bromine redox reaction to take place. The word "adequate" of "adequate surface area" refers to actual surface area that facilitates a rate of redox reaction so as to keep the electrode polarization. The word "tolerance" of "chemical tolerance" refers to not being chemically corroded by the electrolyte or aqueous bromine (which is created at the cathode during charging).

The container 160 comprises an aqueous electrolyte 162. The anode assembly 120 and the cathode assembly 140 are immersed in the aqueous electrolyte 162. The aqueous electrolyte 162 comprises 0.5-8 molars dissolved zinc bromide salt (The electrochemical capacity in the electrolyte is not sufficient when the dissolved zinc bromide salt is less than 0.5 molar. The resistance of the cell is too high to be a practical battery when the dissolved zinc bromide salt is larger than 8 molars), and 0.25-3 molars methyl ethyl pyrrolidinium bromide (MEP-Br) (MEP-Br can complex (sequester) 1-5 molecules of $Br_2$. Solubility of MEP-Br is typically limited to less than 3.5 molars. MEP-Br concentration is less than that of $ZnBr_2$).

In examples of the present disclosure, each of the first insulating microporous membrane 232 of FIG. 2 and the second insulating microporous membrane 552 of FIG. 5 has an average pore size less than 10 microns, an average porosity larger than 30%, and a base thickness in a range from 0.3 mm to 1 mm.

In examples of the present disclosure, each of the first insulating microporous membrane 232 of FIG. 2 and the second insulating microporous membrane 552 of FIG. 5 is made of a polymeric material, including polyvinyl chloride, polypropylene, and polyethylene.

In examples of the present disclosure, the zinc bromide electrochemical cell 102 further comprises additional one or more anode assemblies 122 and additional one or more cathode assemblies 142. The additional one or more anode assemblies 122 and the additional one or more cathode assemblies 142 are arranged in an alternating sequence pattern (anode, cathode, anode, cathode, etc.) The additional one or more anode assemblies 122 and the additional one or more cathode assemblies 142 are immersed in the aqueous electrolyte 162. The anode assembly 120 and each of the additional one or more anode assemblies 122 are connected in parallel to form a negative terminal 121. The cathode assembly 140 and each of the additional one or more cathode assemblies 142 are connected in parallel to form a positive terminal 141.

Referring now to FIG. 2, the first insulating microporous membrane 232 comprises a first side 231, a second side 233 opposite the first side 231, and a first plurality of protrusion elements 239 on the first side 231 of the first insulating microporous membrane 232.

Referring now to FIG. 5, the second insulating microporous membrane comprises a first side 531, a second side 533 opposite the first side 531, and a second plurality of protrusion elements 539 on the first side 531 of the second insulating microporous membrane 532.

In examples of the present disclosure, each of the first plurality of protrusion elements 239 of FIG. 2 and the second plurality of protrusion elements 539 of FIG. 5 is of a respective pyramid shape. In one example, a base of the pyramid shape is of a triangular shape. In another example, a base of the pyramid shape is of a parallelogram shape. In still another example, a base of the pyramid shape is of a rectangular shape. A bottom surface area of the respective pyramid shape is in a range from 0.5 $mm^2$ to 5 $mm^2$. If the protrusion elements are wide and therefore contribute less to the ion transport structures. So the area of base membrane that they cover compared to the whole membrane area should be minimized. So the area of the structures has to be small (0.5 $mm^2$ to 5 $mm^2$). A height of the respective pyramid shape is in a range from 0.3 mm to 1.5 mm. The protrusion elements are there to create a gap between anode and the porous membrane, so that any dendrite developed on the anode will typically break before it reaches the base of the membrane. If the height is too small, then the dendrites will reach the membrane. If the height is too large, then the resistance due to the electrolyte space is too high and efficiency of the cell is reduced. A distance between the respective pyramid shape and an adjacent pyramid shape is in a range from 3 mm to 20 mm. A distance between two such elements should be as large as practical (without collapsing the membrane on to the anode), from 3 mm to 20 mm.

In examples of the present disclosure, the first plurality of protrusion elements 239 of FIG. 2 extend toward inward of the anode pouch 220. The second plurality of protrusion elements 539 of FIG. 5 extend toward outward of the cathode pouch 540.

FIG. 8A is a top view and FIG. 8B is a side view of a portion 820 of an insulating microporous membrane; and FIG. 8C is a top view and FIG. 8D is a side view of a portion 840 of another insulating microporous membrane in examples of the present disclosure.

A thickness of each of the portion 820 and the portion 840 is in a range from 0.02 mm to 2.0 mm. A porosity of each of the portion 820 and the portion 840 is in a range from 20% to 90%. Average pore size of each of the portion 820 and the portion 840 is in a range of 10 nm to 10 micron. Each of the portion 820 and the portion 840 comprises a poly-olefin polymer, including polyethylene. The portion 820 comprises a first side 822 and a second side 824 opposite the first side 822. A first plurality of protrusion elements 831 is on the first side 822. A second plurality of protrusion elements 833 is on the second side 824. At least one side of the portion 840 has small protrusions called "ribs" (a plurality of protrusion elements 851) as shown FIG. 8D. The ribs are co-manufactured, as single-piece construction, with the portion 840 of the insulating microporous membrane. The height of the ribs is between 0.3 mm and 5 mm. Base area of the ribs is between 0.2 $mm^2$ and 9 $mm^2$. Area coverage fraction of the ribs on the portion 840 is between 3% and 60%. The ribs create a definitive physical gap between electrodes (the anode assembly 120 and the cathode assembly 140) in the zinc bromide electrochemical cell 102.

The (common) anode 202 is shown in FIG. 2. The anode 202 comprises an electrically conductive sheet 422 of FIG. 4C comprising a hole 210 for electrical connection. The sheet 422 of FIG. 4C is coated on both sides with coatings. The coating is there to chemically protect the sheet 422 of FIG. 4C and at the same time provide a conductive surface to promote zinc plating during the operation of the zinc bromide electrochemical cell 102. In one example, the sheet 422 of FIG. 4C is made from brass and the coatings are electroplated zinc of thickness between 10 and 200 microns. In another example, the sheet 422 of FIG. 4C is made of brass and coatings are conductive plastic composite comprising a polymer such as polypropylene and graphite. In still another example, the sheet 422 of FIG. 4C is made of another conductive metal such as copper, steel, aluminum or titanium.

The (common) cathode 502 is shown in FIG. 5. The cathode 502 comprises an electrically conductive sheet 742 of FIG. 7C comprising a hole 710 for electrical connection. The sheet 742 of FIG. 7C is coated or flanked on both sides with coatings or layers. The coatings or layers are there to increase the surface area of the cathode to facilitate efficient bromine redox reaction during the operation of the zinc bromide electrochemical cell 102. In one example, the sheet 742 of FIG. 7C is made from titanium and the layers are graphite felts of thickness between 1 mm and 10 mm. In another example, the sheet 742 of FIG. 7C is made of titanium and coating are conductive plastic composite comprised of a polymer such as polypropylene and graphite. In still another example, the sheet 742 of FIG. 7C is made up of another conductive metal such as brass, copper, steel, or aluminum. In yet still another example, the coating may be a conductive polymer composite on top of which a layer of graphite felt is thermally attached.

Arrangement of the anode assembly 120 is shown in FIGS. 2, 3, and 4. The anode assembly 120 comprises an anode 202 flanked on both sides by a first ribbed member 331 of FIG. 3A and a second ribbed member 333 of FIG. 3A, with the ribbed side facing the common anode. The ribs provide a positive definitive gap between the base membrane surface and the anode surface on which the zinc plating develops, thereby highly reducing the chances of any zinc dendrite reaching the base area of the membrane. The membranes are oversized compared to the common anode 202, so that the edges of the membranes can be sealed.

The arrangement is transformed to the completed enclosed common anode assembly 120 by sealing on at least 3 sides as shown in FIG. 2. The membrane, being a thermoplastic material is easily sealed by hot pressing the edges.

Figure 6A:
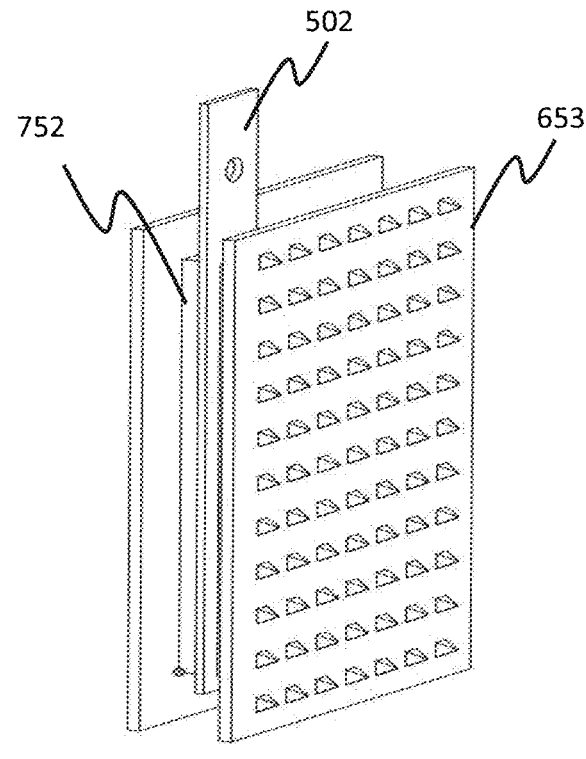
FIG. 6A is an isometric view and FIG. 6B is an exploded plot of a portion of a cathode in examples of the present disclosure.
Figure 6B:
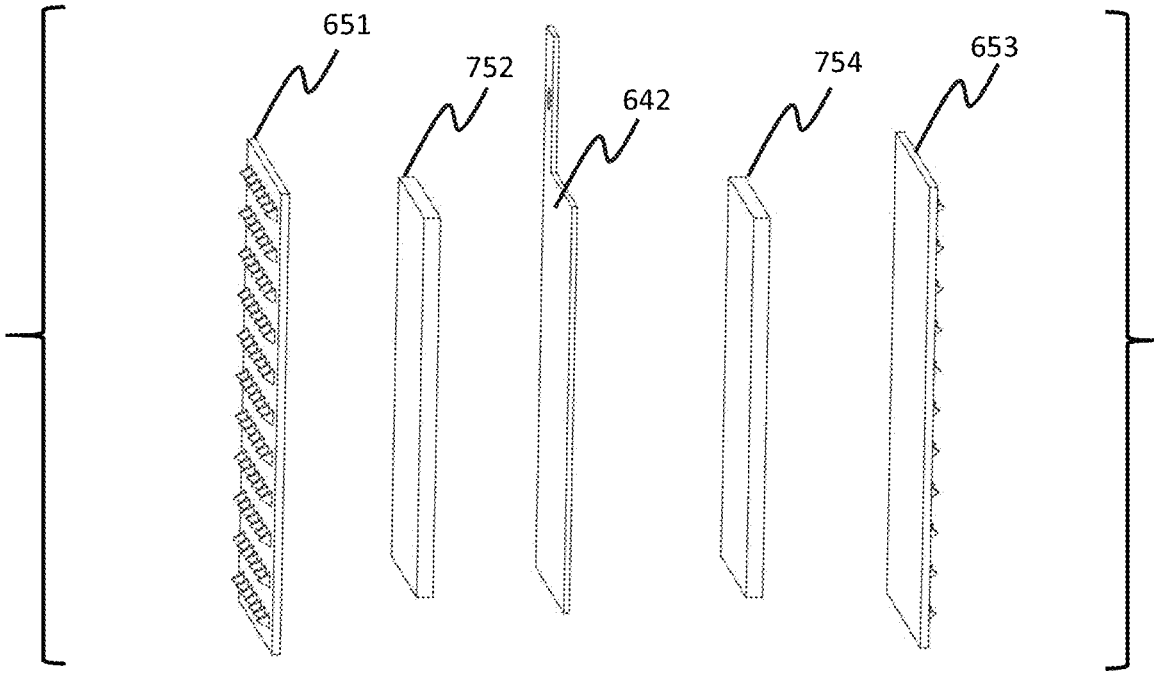
Figures 7A, 7B, 7C:
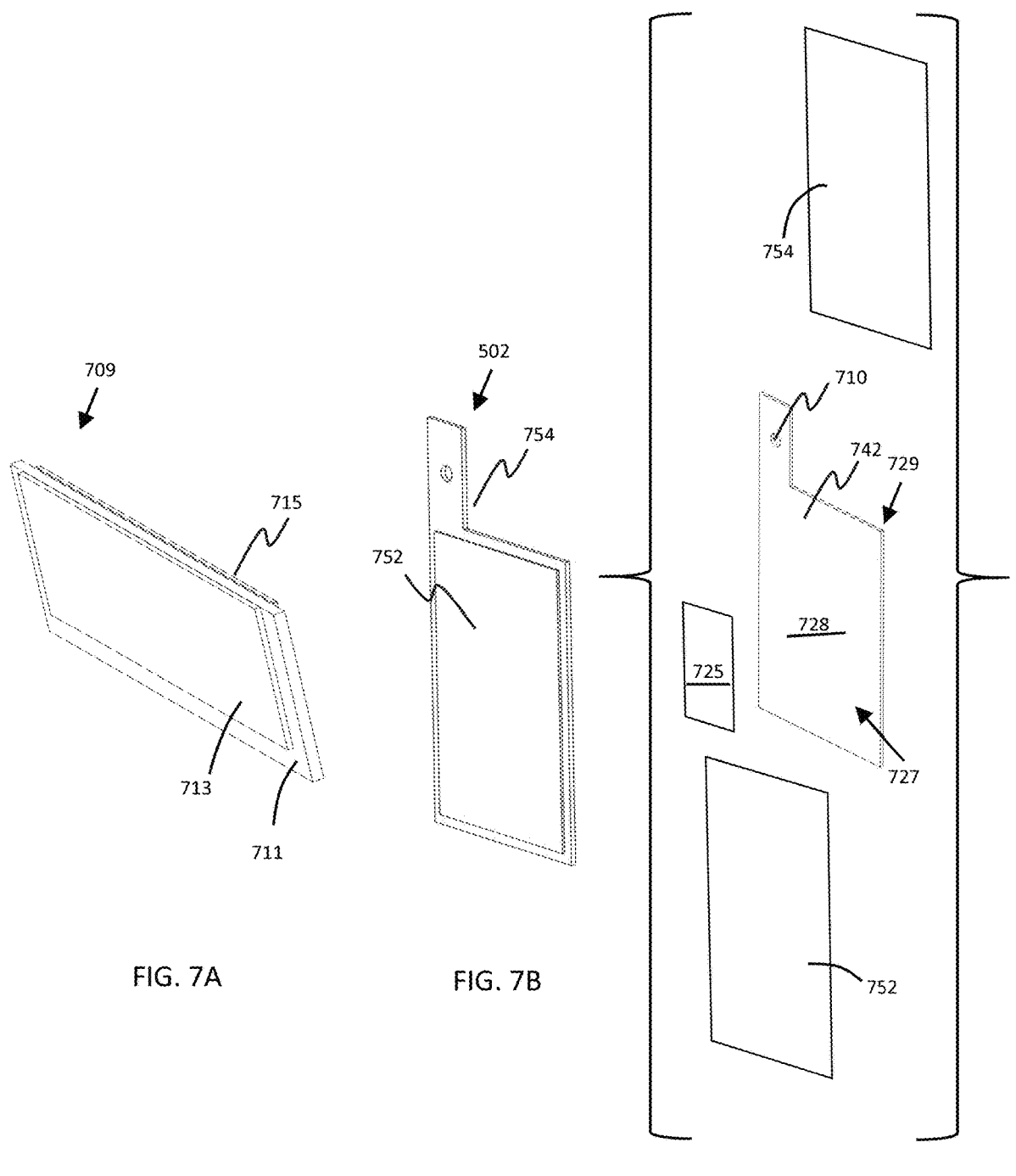
FIG. 7A is an isometric view of a cathode.
FIG. 7B is an isometric view and FIG. 7C is an exploded plot of another cathode in examples of the present disclosure.

Arrangement of the common cathode assembly 140 is shown in FIGS. 5, 6, and 7. The cathode assembly 140 comprises a common cathode 502 flanked on both sides by the conductive layer, such as graphite felts. The felts are further flanked by a first ribbed member 651 and a second ribbed member 653 of FIG. 6B, with the ribbed side facing away from the common cathode. The ribs provide a positive definitive gap between the base membrane surface and the cathode assembly 140, thereby greatly reducing the chances of any zinc dendrite reaching the base area of the membrane. The membranes are oversized compared to the common cathode, so that the edges of the membranes can be sealed.

The arrangement is transformed to the completed enclosed common cathode assembly 140 by sealing on at least 3 sides as shown in FIG. 7. The membrane, being a thermoplastic material is easily sealed by hot pressing the edges.

Battery 100 is shown in FIG. 1A. In FIG. 1B, as an example, three instances of cathode assemblies and two instances of anode assemblies are arranged in alternating pattern. The cathode assemblies and the anode assemblies are then inserted into the container 160. The aqueous electrolyte 162 is filled into the container 160 to an adequate level. The stack may be optionally covered or encapsulated to avoid spillage during transportation or movement. Conductive metallic spacers 103, fastening mechanisms such as nuts and bolts 105, and electrical wire connections 104 are used to connectorize the anode and cathode separately.

Operation of the cell stack during the charging is as follows: The anode assemblies and the cathode assemblies are presented with a negative and positive electrical potential, respectively. Charging effectively starts when the potential difference is greater than the open circuit voltage (OCV), typically 1.73V. Different types of charging algorithms may be used. In examples of the present disclosure, constant current constant voltage fixed time (CC-CV-FT) charging algorithm is used. The voltage is closed-loop adjusted so that a constant current of C/5, where C represents the coulombic capacity of the cell stack construction, flowed into the cell stack as charging current for 5 hours, subject to the maximum cell voltage being 1.92V, upon which the current would be tapered down to maintain the constant current. The discharging current of the cell stack is dictated by the requirement of the external load.

Those of ordinary skill in the art may recognize that modifications of the embodiments disclosed herein are possible. For example, a number of anode assemblies and a number of cathode assemblies may vary. Other modifications may occur to those of ordinary skill in this art, and all such modifications are deemed to fall within the purview of the present invention, as defined by the claims.

The invention claimed is:

1. A zinc bromide electrochemical cell comprising:
   an anode assembly comprising:
       an anode pouch comprising:
           a first insulating microporous membrane, and
       an anode being enclosed in the anode pouch, the anode comprising:
           a first electrically conductive anode plate, and
           a second electrically conductive anode plate opposite the first electrically conductive anode plate, the first electrically conductive anode plate and the second electrically conductive anode plate being configured to be plated with zinc,
   a cathode assembly comprising:
       a cathode pouch comprising:
           a second insulating microporous membrane, and
       a cathode being enclosed in the cathode pouch, the cathode comprising:
           a first electrically conductive cathode plate, and
           a second electrically conductive cathode plate opposite the first electrically conductive cathode plate, the first electrically conductive cathode plate and the second electrically conductive cathode plate being configured to facilitate bromine redox reaction, and
   a container comprising:
       an aqueous electrolyte,
   wherein the anode assembly and the cathode assembly are immersed in the aqueous electrolyte.

2. The zinc bromide electrochemical cell of claim 1 further comprising:
   additional one or more anode assemblies, and
   additional one or more cathode assemblies,
   wherein the additional one or more anode assemblies and the additional one or more cathode assemblies are arranged in an alternating sequence pattern;
   wherein the additional one or more anode assemblies and the additional one or more cathode assemblies are immersed in the aqueous electrolyte;
   wherein the anode assembly and each of the additional one or more anode assemblies are connected in parallel to form a negative terminal; and
   wherein the cathode assembly and each of the additional one or more cathode assemblies are connected in parallel to form a positive terminal.

3. The zinc bromide electrochemical cell of claim 1, wherein a $Zn \leftrightarrow Zn^{2+} + 2e$ redox reaction takes place at the anode; and
   wherein the bromine redox reaction is $Br_2 + 2e \leftrightarrow 2Br-$.

4. The zinc bromide electrochemical cell of claim 1, wherein the anode comprises a titanium or graphite sheet.

5. The zinc bromide electrochemical cell of claim 1, wherein the anode comprises a zinc plated brass sheet.

6. The zinc bromide electrochemical cell of claim 1, wherein the anode further comprises:
   a metallic sheet comprising:
       a first side, and
       a second side opposite the first side,
   wherein each of the first side and the second side of the metallic sheet of the anode is coated with a respective conductive non-porous plastic-graphite composite.

7. The zinc bromide electrochemical cell of claim 6, wherein a thickness of the respective conductive non-porous plastic-graphite composite is in a range from 0.2 mm to 1.0 mm.

8. The zinc bromide electrochemical cell of claim 6, wherein the respective conductive non-porous plastic-graphite composite has a bulk electrical resistivity less than 100 Ohm-cm.

9. The zinc bromide electrochemical cell of claim 1, wherein the cathode comprises a titanium or graphite sheet.

10. The zinc bromide electrochemical cell of claim 1, wherein the cathode comprises:
   a titanium or graphite sheet comprising:
      a first side, and
      a second side opposite the first side,
   wherein each of the first side and the second side of the titanium or graphite sheet of the cathode is with a respective graphite or carbon felt.

11. The zinc bromide electrochemical cell of claim 1, wherein the cathode comprises:
   a metallic sheet comprising:
      a first side, and
      a second side opposite the first side,
   wherein each of the first side and the second side of the metallic sheet of the cathode is coated with a respective conductive non-porous thermoplastic-graphite composite, being covered by a respective additional high-surface area structure.

12. The zinc bromide electrochemical cell of claim 11, wherein the respective additional high-surface area structure is a graphite or carbon felt adhered to the respective conductive non-porous thermoplastic-graphite composite coating by applying heat treatment.

13. The zinc bromide electrochemical cell of claim 1, wherein each of the first insulating microporous membrane and the second insulating microporous membrane has an average pore size less than 10 microns, an average porosity larger than 30%, and a base thickness in a range from 0.3 mm to 1 mm.

14. The zinc bromide electrochemical cell of claim 1, wherein each of the first insulating microporous membrane and the second insulating microporous membrane is made of a polymeric material.

15. The zinc bromide electrochemical cell of claim 1, wherein the first insulating microporous membrane comprises:
   a first side,
   a second side opposite the first side of the first insulating microporous membrane, and
   a first plurality of protrusion elements on the first side of the first insulating microporous membrane;

wherein the second insulating microporous membrane comprises:
   a first side,
   a second side opposite the first side of the second insulating microporous membrane, and
   a second plurality of protrusion elements on the first side of the second insulating microporous membrane.

16. The zinc bromide electrochemical cell of claim 15, wherein each of the first plurality of protrusion elements and the second plurality of protrusion elements is of a respective pyramid shape;
   wherein a bottom surface area of the respective pyramid shape is in a range from 0.5 $mm^2$ to 5 $mm^2$;
   wherein a height of the respective pyramid shape is in a range from 0.3 mm to 1.5 mm; and
   wherein a distance between the respective pyramid shape and an adjacent pyramid shape is in a range from 3 mm to 20 mm.

17. The zinc bromide electrochemical cell of claim 15, wherein the first plurality of protrusion elements extend toward inward of the anode pouch; and
   wherein the second plurality of protrusion elements extend toward outward of the cathode pouch.

18. The zinc bromide electrochemical cell of claim 1, wherein the aqueous electrolyte comprises 0.5-8 molar dissolved zinc bromide salt, and 0.25-3 molar methyl ethyl pyrrolidinium bromide (MEP-Br).

19. The zinc bromide electrochemical cell of claim 1 further comprising:
   a compressible foam between the container and the anode assembly.

20. The zinc bromide electrochemical cell of claim 1 further comprising:
   additional one or more anode assemblies, and
   additional one or more cathode assemblies,
   wherein the anode assembly and each of the additional one or more anode assemblies are connected in parallel; and
   wherein the cathode assembly and each of the additional one or more cathode assemblies are connected in parallel.

* * * * *